(12) United States Patent
Fujita et al.

(10) Patent No.: US 7,830,400 B2
(45) Date of Patent: Nov. 9, 2010

(54) DISPLAY UNIT

(75) Inventors: Yuka Fujita, Tokyo (JP); Toshiyuki Takahashi, Tokyo (JP); Atsushi Hori, Tokyo (JP); Koichi Hiramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 980 days.

(21) Appl. No.: 10/589,903

(22) PCT Filed: Apr. 12, 2004

(86) PCT No.: PCT/JP2004/005218

§ 371 (c)(1),
(2), (4) Date: Aug. 17, 2006

(87) PCT Pub. No.: WO2005/101819

PCT Pub. Date: Oct. 27, 2005

(65) Prior Publication Data

US 2007/0171235 A1    Jul. 26, 2007

(51) Int. Cl.
*G09G 5/02* (2006.01)

(52) U.S. Cl. .................. 345/698; 345/660; 345/699; 348/14.13; 348/568

(58) Field of Classification Search ............... 348/14.13, 348/568; 345/698, 699, 660
See application file for complete search history.

(56) References Cited

U.S. PATENT DOCUMENTS 6,097,757 A * 8/2000 Boice et al. ................ 375/240
6,452,579 B1 * 9/2002 Itoh et al. ................... 345/100
2002/0154088 A1  10/2002 Nishimura
2003/0030749 A1 * 2/2003 Kondo et al. ............... 348/458
2004/0019582 A1  1/2004 Brown

FOREIGN PATENT DOCUMENTS

| CN | 1471075 A | 1/2004 |
| EP | 1126721 A1 | 8/2001 |
| EP | 1134918 A1 | 9/2001 |

(Continued)

OTHER PUBLICATIONS

Presti et al., "TAO: Temporal Algebraic Operators for modeling multimedia presentations", Journal of Network and Computer Applications, pp. 319-342, vol. 25, (2002), XP002496018.

*Primary Examiner*—Michelle K Lay
(74) *Attorney, Agent, or Firm*—Birch, Stewart, Kolasch & Birch, LLP.

(57) ABSTRACT

A display unit has an image presentation section 10 for receiving a plurality of monomedia data and presentation style data describing a presentation style of a frame of each of the individual monomedia data, for generating scaling/combining control information 111 for combining the individual monomedia data, and for generating a composite video frame 103 by combining the individual monomedia data; an image enhancing section 20 for obtaining a correction target region of designated monomedia data in the composite video frame 103 in response to the scaling/combining control information 111, for generating correction data by obtaining interframe difference in the correction target region, and for generating a display video frame 104 by carrying out image enhancing processing of the correction target region in response to the correction data generated; and an image display section 30 for displaying the display video frame 104.

8 Claims, 4 Drawing Sheets

FOREIGN PATENT DOCUMENTS

| | | | |
|---|---|---|---|
| EP | 1328114 A1 * | 7/2003 | |
| JP | 2001-175239 A | 6/2001 | |
| JP | 2002-323876 A | 11/2002 | |
| JP | 2003-345318 A | 12/2003 | |
| WO | WO-00/05899 A1 | 2/2000 | |

* cited by examiner

DISPLAY UNIT

TECHNICAL FIELD

The present invention relates to a display unit for displaying composite images resulting from combining monomedia such as moving pictures, text/graphics and still pictures.

BACKGROUND ART

Conventional display units, which display composite images resulting from combining monomedia such as moving pictures, text/graphics and still pictures, offer easy-to-see composite video display to viewers by changing display attributes of uninterested windows such as reducing luminance or frame rate or size of uninterested windows to mitigate eyestrain or the like as disclosed in Japanese patent application laid-open No. 2001-175239, for example.

With the foregoing configuration, the conventional display unit has a problem of being likely to make low image quality display unintended by a producer of the contents or a user of a personal computer who instructs to present the windows on the entire screen, because the display unit changes the display attributes of the uninterested windows such as lowering the luminance or frame rate, or reducing the window size.

The present invention is implemented to solve the foregoing problem. Therefore it is an object of the present invention to provide a display unit capable of achieving high quality image display just as intended by a person who instructs to present the windows on the entire screen by setting a certain region of interframe difference as a window of interest and by carrying out image enhancing processing of the window of interest.

DISCLOSURE OF THE INVENTION

A display unit in accordance with the present invention includes: image presentation means for receiving a plurality of monomedia data and presentation style data describing a presentation style of a frame of each of the individual monomedia data, for generating scaling/combining control information for combining the individual monomedia data, and for generating a composite video frame by combining the individual monomedia data; image enhancing means for obtaining a correction target region of designated monomedia data in the composite video frame in response to the scaling/combining control information, for generating correction data by obtaining interframe difference in the correction target region, and for generating a display video frame by carrying out image enhancing processing of the correction target region in response to the correction data generated; and image display means for displaying the display video frame generated.

The present invention offers an advantage of being able to implement the high quality image display in accordance with the intention of the person who carries out the window presentation instruction to the entire screen.

BEST MODE FOR CARRYING OUT THE INVENTION

The best mode for carrying out the invention will now be described with reference to the accompanying drawings to explain the present invention in more detail.

Embodiment 1

Figure 1:
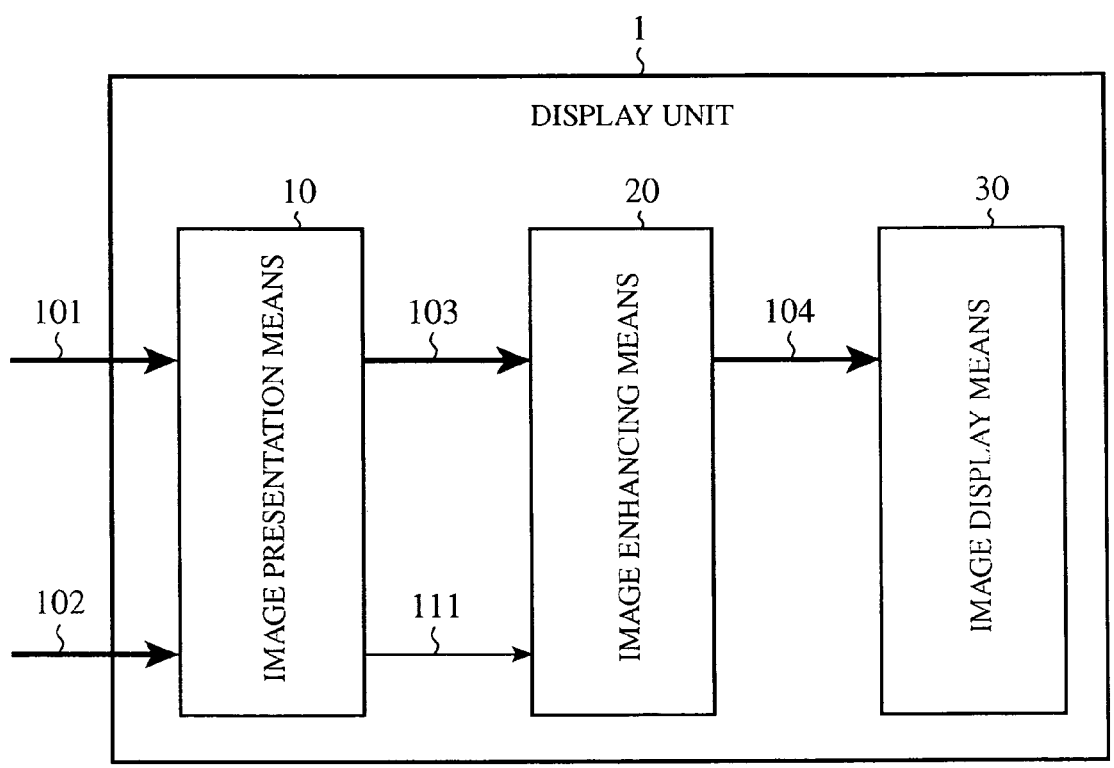
FIG. 1 is a block diagram showing a configuration of a display unit of an embodiment 1 in accordance with the present invention.

FIG. 1 is a block diagram showing a configuration of a display unit of an embodiment 1 in accordance with the present invention. The display unit 1 includes an image presentation means 10, image enhancing means 20 and image display means 30.

In FIG. 1, receiving video data 101 and data broadcasting service data 102 from a digital broadcasting service center, the image presentation means 10 acquires a plurality of monomedia data such as moving picture data, text/graphics data and still picture data and presentation style data describing the presentation style of a frame of each monomedia data; generates scaling/combining control information 111 for combining the individual monomedia data; and generates a composite video frame 103 by combining the individual monomedia data. The image enhancing means 20 obtains a correction target region of designated monomedia data in the composite video frame 103 according to the scaling/combining control information 111; generates correction data by obtaining interframe difference of the correction target region; and generates a display video frame 104 through the image enhancing processing of the correction target region in response to the correction data generated. The image display means 30 displays the display video frame 104 fed from the image enhancing means 20 on an image display panel or the like.

Figure 2:
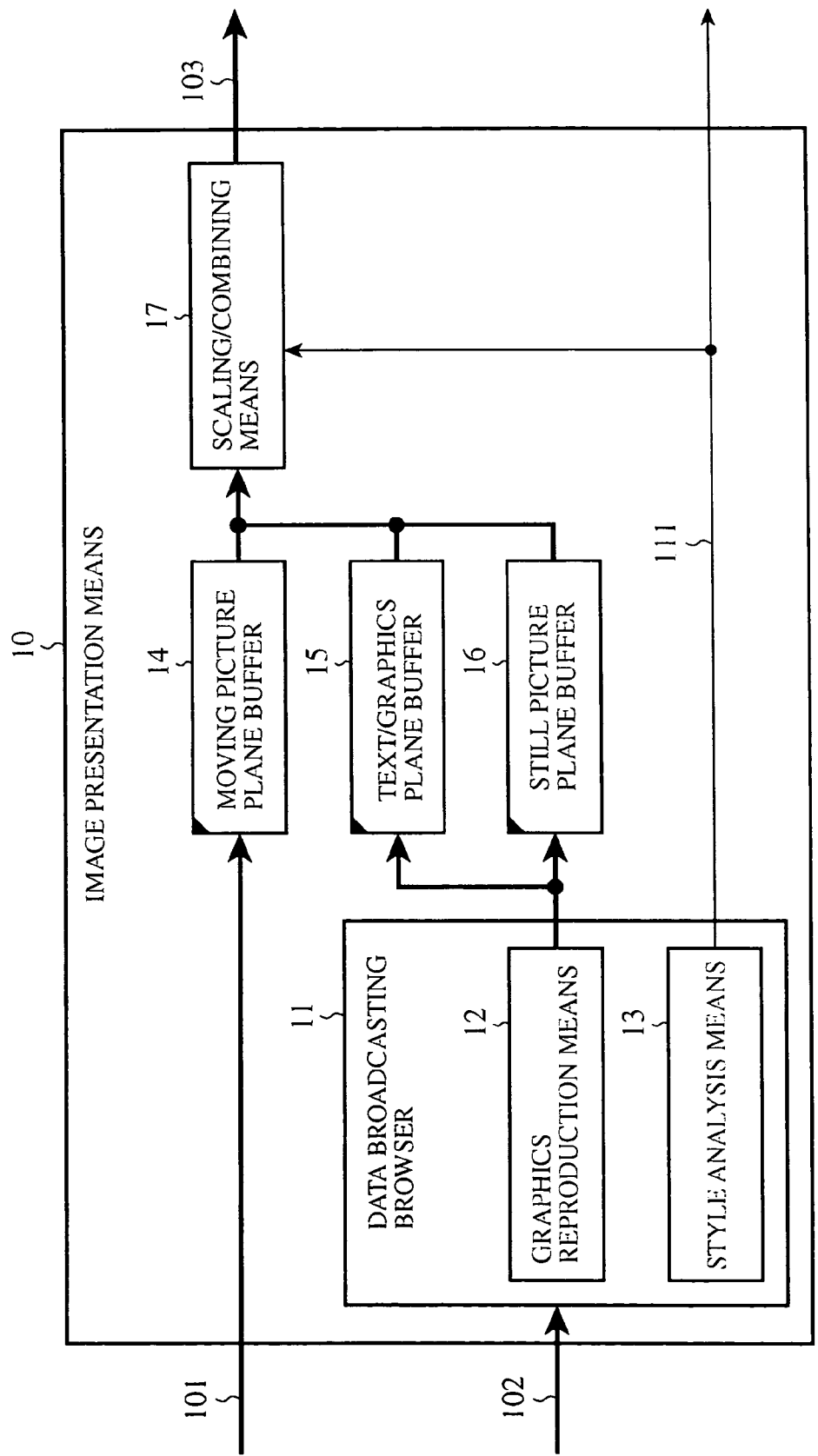
FIG. 2 is a block diagram showing an internal configuration of an image presentation means of the display unit of the embodiment 1 in accordance with the present invention.

FIG. 2 is a block diagram showing an internal configuration of the image presentation means 10. The image presentation means 10 includes a data broadcasting browser 11, moving picture plane buffer 14, text/graphics plane buffer 15, still picture plane buffer 16 and scaling/combining means 17. The data broadcasting browser 11 includes a graphics reproduction means 12 and style analysis means 13.

In FIG. 2, the data broadcasting browser 11 separates the monomedia such as text/graphics data and still picture data contained in the input data broadcasting service data 102 from the presentation style data describing the presentation styles of the frames; reproduces the monomedia separated; and generates the scaling/combining control information 111 providing scaling/combining methods of the individual monomedia data such as moving picture data, text/graphics data and still picture data by analyzing the presentation style data separated. The graphics reproduction means 12, which is contained in the data broadcasting browser 11, regenerates the monomedia data such as the text/graphics data and still picture data contained in the data broadcasting service data 102. The style analysis means 13, which is contained in the data broadcasting browser 11, analyzes the presentation style data describing the presentation styles of the frames contained in the data broadcasting service data 102, thereby generating the scaling/combining control information 111 providing the scaling/combining methods of the monomedia data such as the moving picture data, text/graphics data and still picture data. The moving picture plane buffer 14 stores the video data 101 which is the input moving picture data until the scaling/combining means 17 carries out the scaling/combining processing. The text/graphics plane buffer 15 stores the text/graphics data output from the graphics reproduction means 12 until the scaling/combining means 17 carries out the scaling/combining processing. The still picture plane buffer 16 stores the still picture data output from the graphics reproduction means 12 until the scaling/combining means 17 carries out the scaling/combining processing. According to the scaling/combining control information 111 fed from the style analysis means 13, the scaling/combining means 17 generates the composite video frame 103 by scaling and combining the moving picture data, text/graphics data and still picture data stored in the moving picture plane buffer 14, text/graphics plane buffer 15 and still picture plane buffer 16.

Figure 3:
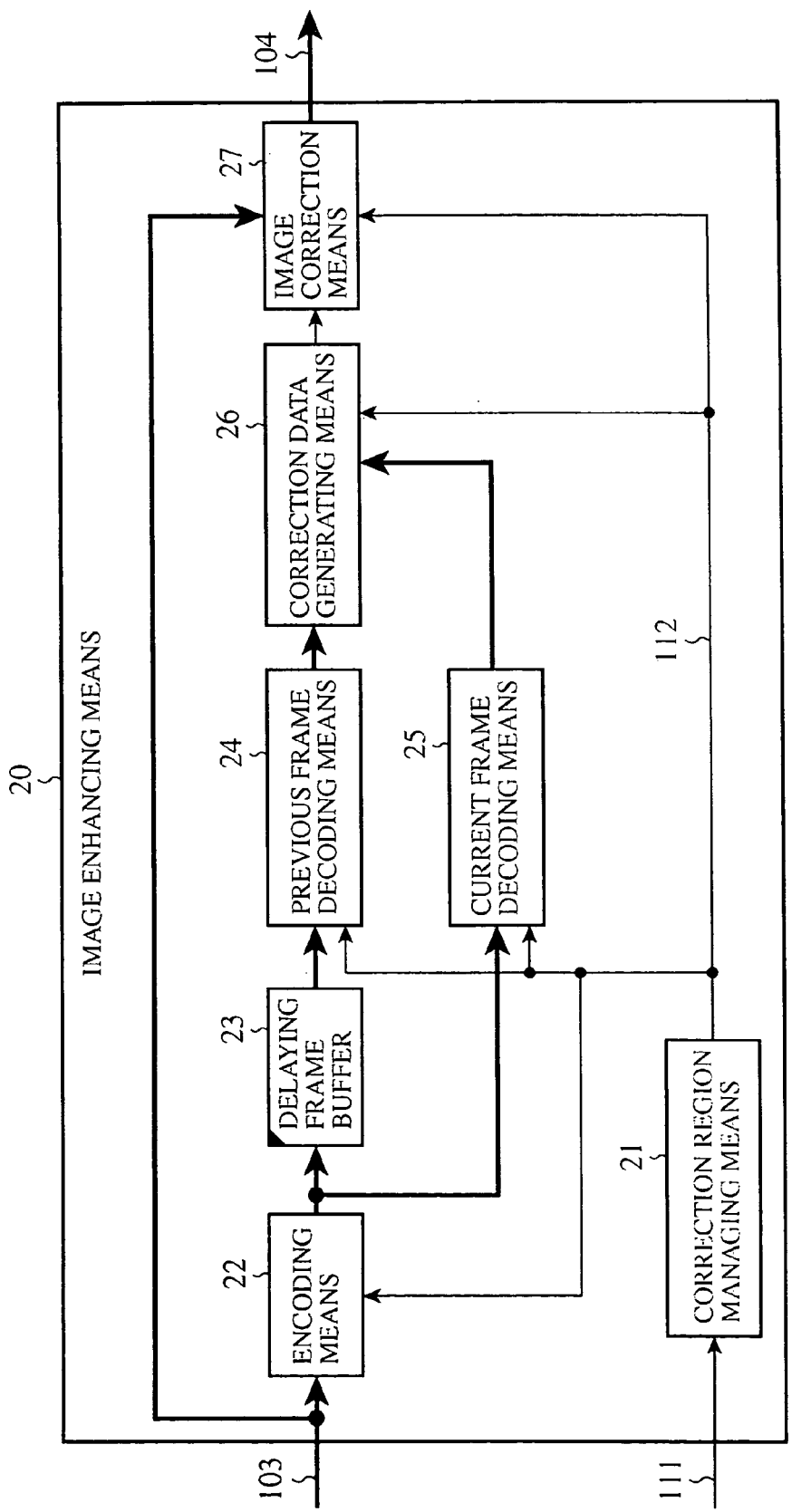
FIG. 3 is a block diagram showing an internal configuration of an image enhancing means of the display unit of the embodiment 1 in accordance with the present invention.

FIG. 3 is a block diagram showing an internal configuration of the image enhancing means 20. The image enhancing means 20 includes a correction region managing means 21, encoding means 22, delaying frame buffer 23, previous frame decoding means 24, current frame decoding means 25, correction data generating means 26 and image correction means 27.

In FIG. 3, the correction region managing means 21, receiving the scaling/combining control information 111 of the individual monomedia fed from the image presentation means 10, obtains the correction target region of the designated monomedia data in the composite video frame 103; and generates correction target region/compression ratio information 112 by obtaining the minimum necessary compression ratio in the correction target region. The encoding means 22 receives the composite video frame 103, and encodes the correction target region instructed by the correction target region/compression ratio information 112 fed from the correction region managing means 21 at the compression ratio instructed. The delaying frame buffer 23 delays the encoded data by an interval of one frame by storing the encoded data fed from the encoding means 22. Here, the delaying frame buffer 23 has a memory capacity of no more than one frame of the composite video frame 103, and is assumed to have a capacity of only ¼ frame of the composite video frame 103, for example. This is because an enormous amount of memory capacity is required to store one frame of the composite video frame 103 because it has a vast amount of data. The previous frame decoding means 24 decodes the encoded data, which is stored in the delaying frame buffer 23 and delayed by an interval of one frame, at the compression ratio instructed by the correction target region/compression ratio information 112 fed from the correction region managing means 21. The current frame decoding means 25 decodes the encoded data fed from the encoding means 22 at the compression ratio instructed by the correction target region/compression ratio information 112 fed from the correction region managing means 21. The correction data generating means 26 obtains, as to the correction target region instructed by the correction target region/compression ratio information 112 fed from the correction region managing means 21, the interframe difference by comparing the decoded data fed from the previous frame decoding means 24 with the decoded data fed from the current frame decoding means 25, and generates the correction data corresponding to the interframe difference obtained.

The image correction means 27 carries out the image enhancing processing by correcting the correction target region in the composite video frame 103 instructed by the correction target region/compression ratio information 112 fed from the correction region managing means 21 in response to the correction data fed from the correction data generating means 26, and generates the display video frame 104 to be supplied to the image display means 30. Here, both the previous frame decoding means 24 and the current frame decoding means 25 are provided with equivalent processing functions.

Next, the operation will be described.

First, the operation of the image presentation means 10 will be described.

The video data 101 of one frame sent from the digital broadcasting service center is stored in the moving picture plane buffer 14 of the image presentation means 10. In addition, the data broadcasting browser 11 of the image presentation means 10 receives the data broadcasting service data 102 transmitted from the digital broadcasting service center, and separates the monomedia data such as text/graphics data and still picture data from the presentation style data describing the presentation styles of the frames. Here, the presentation style data describes in a text format the information about presenting the individual monomedia data on a frame such as scale information, arrangement information, text information such as about character colors and typefaces, and overlap information about the still pictures.

The graphics reproduction means 12 reproduces the monomedia data of the text/graphics data and still picture data separated, and stores them in the text/graphics plane buffer 15 and still picture plane buffer 16. The style analysis means 13 analyzes the presentation style data in the data broadcasting service data 102, and generates the scaling/combining control information 111 about the individual monomedia data, which provides the scaling/combining methods of the individual monomedia such as the moving picture data, text/graphics data and still picture data. The scaling/combining control information 111 describes information about presenting the individual monomedia data such as the scale information, arrangement information and composite information on the data structure of the display unit 1.

The scaling/combining means 17 carries out scaling and combining of the moving picture data, text/graphics data and still picture data stored in the moving picture plane buffer 14, text/graphics plane buffer 15 and still picture plane buffer 16 in accordance with the scaling/combining control information 111 fed from the style analysis means 13, and generates the composite video frame 103.

Figure 4:
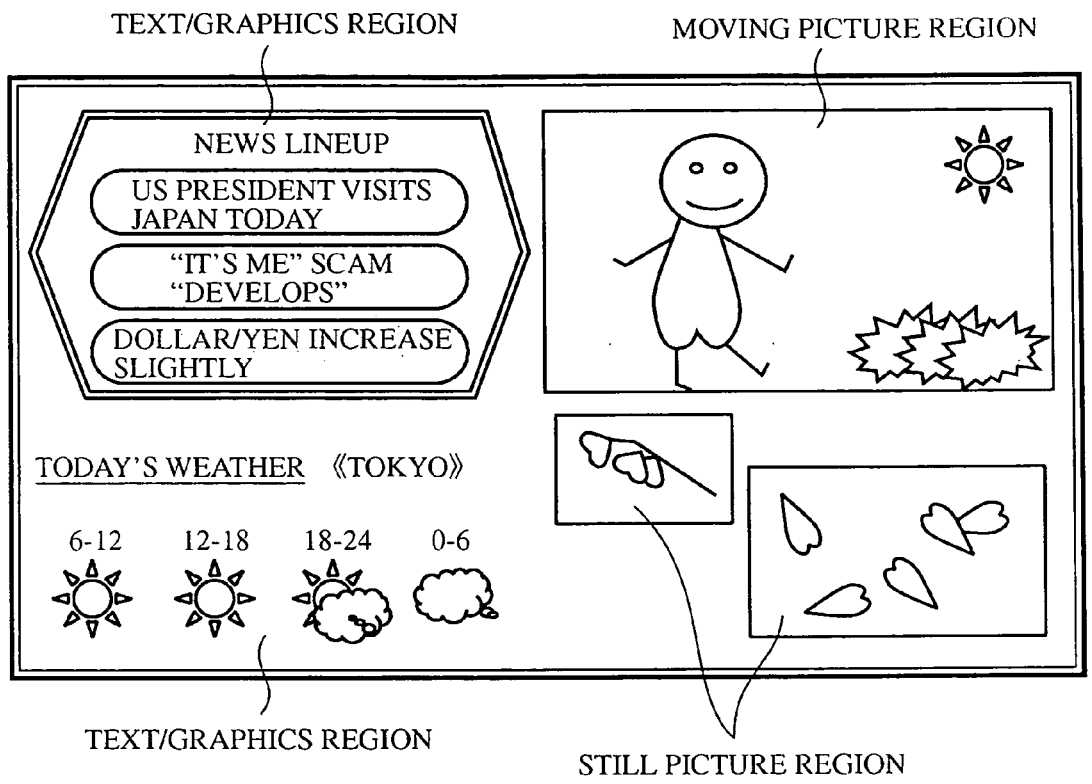
FIG. 4 is a diagram illustrating an example of a composite video frame composed by the image presentation means of the display unit of the embodiment 1 in accordance with the present invention.

FIG. 4 is a diagram illustrating an example of the composite video frame 103 combined by the scaling/combining means 17 of the image presentation means 10.

The image presentation means 10 generates the composite video frame 103 by repeatedly performing the foregoing processing on each frame of the input video data 101.

Next, the operation of the image enhancing means 20 will be described.

It is assumed that the correction region managing means 21 sets in advance a region of the monomedia data to become a correction target in the input composite video frame 103 input to the image enhancing means 20. For example, it is assume that a certain region of the moving picture data, which is monomedia data that can have interframe difference between all the frames, is set as the correction target. Then, receiving the scaling/combining control information 111 of each monomedia data fed from the image presentation means 10, the correction region managing means 21 obtains, when it receives the scaling/combining control information 111 of the monomedia data set as the correction target, the correction target region of the correction target defined; calculates the minimum necessary compression ratio from the correction target region obtained and the memory capacity of the delaying frame buffer 23; generates the correction target region/compression ratio information 112; and sends it to the encoding means 22, previous frame decoding means 24, current frame decoding means 25, correction data generating means 26 and image correction means 27.

Here, the calculation of the compression ratio will be described in more detail by way of example in which the delaying frame buffer 23 has a memory capacity corresponding to ¼ of the composite video frame 103. In this case, when the correction target region covers the entire frame, the compression ratio corresponding thereto is ¼ so that a region of 2 pixels×2 pixels (called 2×2 pixels from now on) undergoes compression encoding to the capacity of 1×1 pixel. On the other hand, when the correction target region is ¼ of one frame, the compression ratio corresponding thereto is one so that it can be handled as noncompression.

Next, a case will be described where the first composite video frame 103, a first frame, is supplied from the image presentation means 10.

The encoding means 22 of the image enhancing means 20 receives the first composite video frame 103 from the image presentation means 10; cuts out every 8×8 bits, for example; carries out fixed-length encoding of the correction target region instructed by the correction target region/compression ratio information 112 fed from the correction region managing means 21 at the compression ratio instructed; and stores the first encoded data into the delaying frame buffer 23. The encoding means 22 repeatedly carries out the fixed-length encoding of the individual 8×8 bits, for example, and stores the first encoded data of the correction target region in the single frame of the first composite video frame 103 into the delaying frame buffer 23.

The first composite video frame 103 fed from the image presentation means 10 is also supplied to the image correction means 27. In this case, since the correction data generating means 26 has not yet generated the correction data, the image correction means 27 supplies the image display means 30 with the input first composite video frame 103 without change as the display video frame 104, and the image display means 30 displays the display video frame 104 uncorrected.

Next, a case will be described where the second composite image frame, a second frame, is fed from the image presentation means 10.

First, the previous frame decoding means 24 extracts the first encoded data stored in the delaying frame buffer 23, for example; carries out the fixed-length decoding of the first encoded data at the compression ratio instructed by the correction target region/compression ratio information 112 fed from the correction region managing means 21; and supplies the 8×8 bit first decoded data to the correction data generating means 26.

At the same time, the encoding means 22 receives the second composite video frame 103, the second frame, from the image presentation means 10; cuts out every 8×8 bits, for example; carries out fixed-length encoding of the correction target region instructed by the correction target region/compression ratio information 112 fed from the correction region managing means 21 at the compression ratio instructed; stores the second encoded data in a vacant region of the delaying frame buffer 23; and supplies the second encoded data to the current frame decoding means 25.

The current frame decoding means 25 carries out the fixed-length decoding of the second encoded data, for example, at the compression ratio instructed by the correction target region/compression ratio information 112 fed from the correction region managing means 21, and supplies the 8×8 bit second decoded data to the correction data generating means 26.

The correction data generating means 26 obtains the interframe difference by comparing the 8×8 bit first decoded data output from the previous frame decoding means 24, for example, with the 8×8 bit second decoded data output from the current frame decoding means 25, for example; and generates the optimum correction data from the interframe difference obtained. In the course of this, the correction data generating means 26, when it is configured in such a manner that it generates the correction data with specializing in gradation, for example, generates, when the gradation values of the interframe difference obtained vary, the correction data for optimizing the gradation values of the pixels of interest in correspondence to the interframe difference to enhance the image quality of the correction target region. In this way, the correction data generating means 26 generates the correction data about the values of the display attributes such as gradation and luminance obtained from the interframe difference of the correction target region.

As a result of the repetition of the decoding processing of the first encoded data stored in the delaying frame buffer 23 by the previous frame decoding means 24, the decoding processing of the second encoded data encoded by the encoding means 22 by the current frame decoding means 25, and the correction data generating processing on an 8×8 bit basis by the correction data generating means 26, the correction data generating means 26 generates the correction data of one frame and supplies the data to the image correction means 27.

The image correction means 27 carries out the image enhancing processing by correcting the correction target region in the second composite image frame instructed by the correction target region/compression ratio information 112 fed from the correction region managing means 21 with the correction data fed from the correction data generating means 26, thereby generating and supplying the display video frame 104 to the image display means 30.

Finally, the image display means 30 displays the display video frame 104 passing through the correction and output from the image enhancing means 20. Thus the high quality image display is achieved.

Here, the reason for handling only the monomedia data that is likely to have the interframe difference as the correction target will be described.

In the data broadcasting service of the digital broadcasting, a moving picture region, still picture region, text/graphics region and the like as shown in FIG. 4, for example, are broadcast, received and reproduced as digital information, and are combined by arranging them into one screen by the image presentation means 10 including the data broadcasting browser 11, thereby improving the broadcasting service. Thus, in the digital broadcasting, not as in the analog broadcasting in which a broadcasting station combines frames to be broadcast, a receiving side decodes the monomedia data transmitted individually from the digital broadcasting service center one by one, and combines them into one screen by carrying out scaling/combining.

Consequently, an apparatus, which digitizes the processing from the image presentation to the image display such as integrating the image presentation means 10 including the data broadcasting browser 11 into the image display means 30, can handle the monomedia data regions without the interframe difference such as the text/graphics data and still picture data as the fixed data without an error of even one pixel on a screen. Thus, it can handle only the monomedia data such as the moving picture data that may have the interframe difference as the correction target.

Although the moving picture data is set in the correction region managing means 21 as the correction target in the example, this is not essential. For example, other monomedia data such as the text/graphics data can be set as the correction target when the text/graphics data has the interframe difference frequently as in animated cartoons.

In addition, although the foregoing example includes the presentation style data in the contents as in the data broadcasting service of the digital broadcasting, this not essential. For example, when the presentation style of the frame is determined by the instruction of a user of a personal computer or the like, it is also possible to generate the presentation style data by the display unit 1 or personal computer to be provided to the style analysis means 13.

Next, a case where the presentation style of the frame is changed will be described.

The changes in the presentation style include: a case where the style analysis means 13 of the data broadcasting browser 11 changes the scaling/combining control information 111 because of the changes in the presentation style data transmitted from the digital broadcasting service center; and a case where the user provides an instruction to the style analysis means 13 through the operation of the personal computer to change the scaling/combining control information 111.

Acquiring the presentation style data changed, the style analysis means 13 of the image presentation means 10 analyzes the presentation style data, and generates for each monomedia data the scaling/combining control information 111 changed. In addition, the correction region managing means 21 of the image enhancing means 20, receiving the scaling/combining control information 111 changed, generates the correction target region/compression ratio information 112 changed, and the image enhancing means 20 carries out the image enhancing processing of the composite video frame 103 in the same manner as described above, thereby enabling the corresponding image enhancing processing at the changes in the presentation style.

In addition, the changes in the presentation style of the frame can also include a case where the frame providing the data broadcasting display as shown in FIG. 4 is changed to the frame providing the moving picture display all over the screen by changing the scaling/combining control information 111 in response to the instruction to the style analysis means 13 of the data broadcasting browser 11 by the user through the operation of the personal computer or the like.

Figure 5:
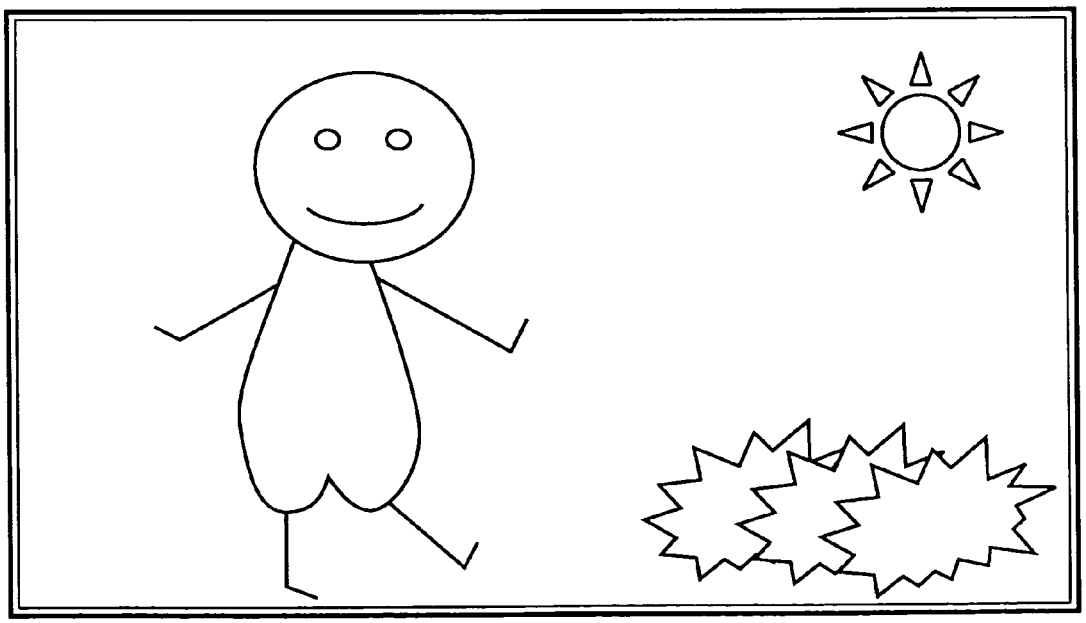
FIG. 5 is a diagram illustrating an example of a frame output from the image presentation means of the display unit of the embodiment 1 in accordance with the present invention.

FIG. 5 is a diagram illustrating an example of a frame output from the scaling/combining means 17 of the image presentation means 10, in which the frame constitutes a data broadcasting display OFF/whole screen moving picture display frame. According to the idea of the foregoing image enhancing processing, when the display is changed to such a great extent as in this case, the image enhancing processing must be applied to the whole screen. However, human vision cannot perceive a little image enhancement because the great changes attract his or her attention.

In view of this, the correction region managing means 21, receiving the scaling/combining control information 111 changed, regenerates the correction target region/compression ratio information 112; compares the correction target region/compression ratio information 112 about the previous frame before the change with the correction target region/compression ratio information 112 about the newly generated current frame after the change; and supplies, when a large extent of change occurs, the new correction target region/compression ratio information 112 to the individual components in the image enhancing means 20. Then, detecting that the presentation style of the frame is greatly changed from the correction target region/compression ratio information 112 before the change and the correction target region/compression ratio information 112 after the change, the correction data generating circuit 26 does not carry out, for the frame corresponding to the correction target region/compression ratio information 112 after the change, the generating processing of the frame difference detecting processing from the previous frame or the correction data generating processing.

Although the correction data generating means 26 does not carry out the frame difference detecting processing nor the correction data generating processing in the foregoing example, any configuration is possible as long as it does not carry out the image enhancing processing when the presentation style of the frame has great changes. For example, consider a case where no previous frame is present as at the start of the display. In this case, since the encoded data stored in the delaying frame buffer 23 cannot be used, a signal corresponding to the first input frame must be prepared, and a configuration is also possible which provides notification of the changes in the scaling/combining control information 111 using the signal.

As described above, according to the present embodiment 1, the image presentation means 10 receives a plurality of monomedia data and the presentation style data describing the presentation styles of the frames of the individual monomedia data; generates the scaling/combining control information 111 for combining the individual monomedia data; and generates the composite video frame by combining the individual monomedia data: and the image enhancing means 20 obtains the correction target region of the designated monomedia data in the composite video frame 103 in response to the scaling/combining control information 111; generates the correction data by obtaining the interframe difference in the correction target region; and generates the display video frame 104 by carrying out the image enhancing processing of the correction target region according to the generated correction data. Thus, the present embodiment 1 can offer an advantage of being able to implement the high quality image display in accordance with the intention of the person who carries out the window presentation instruction to the entire screen.

In addition, according to the present embodiment 1, the image enhancing means 20 has to carry out the encoding/decoding processing of only the correction target region with the interframe difference, which can enhance the speed of the processing, and reduce the compression ratio without changing the memory capacity of the delaying frame buffer 23 in the image enhancing means 20 in proportion to the size of the correction target region. Thus, the present embodiment 1 can reduce the deterioration in the image quality by the encoding/decoding, thereby offering an advantage of being able to carry out the high quality image display by the image display means 30.

Furthermore, according to the present embodiment 1, at the changes in the presentation style, the style analysis means 13 of the image presentation means 10 generates the scaling/combining control information 111 changed; the correction region managing means 21 of the image enhancing means 20 generates the correction target region/compression ratio information 112 changed; and the image enhancing means 20 carries out the image enhancing processing. Thus, the present embodiment 1 offers an advantage of being able to implement the high quality image display in accordance with the intention of the person who carries out the window presentation instruction to the entire screen even at the changes of the presentation style.

Moreover, according to the present embodiment 1, at the considerable changes in the presentation style, the image enhancing means 20 does not carry out the image enhancing processing having little visual effect, offering an advantage of being able to improve the efficiency of the processing of the entire display unit 1.

INDUSTRIAL APPLICABILITY

As described above, the display unit in accordance with the present invention is suitable for implementing the high quality image display in accordance with the intention of the person who carries out the window presentation instruction to the entire screen by performing the image enhancing processing by correcting the correction target region with the interframe difference.

What is claimed is:

1. A display unit comprising:
    an image presentation unit receiving a plurality of monomedia data and presentation style data describing a presentation style of a frame of each of the individual monomedia data, generating scaling/combining control information for combining the individual monomedia data, and generating a composite video frame by combining the individual monomedia data; and
    an image enhancing unit obtaining a correction target region of designated monomedia data in the composite video frame in response to the scaling/combining control information, generating correction data by obtaining interframe difference in the correction target region, and generating a video frame by carrying out image enhancing processing of the correction target region in response to the correction data generated, wherein
    when the presentation style of the frame is changed,
        said image presentation unit generates the scaling/combining control information; and
        said image enhancing unit generates the video frame by carrying out the image enhancing processing of the correction target region in response to the scaling/combining control information changed, and
    when detecting that the presentation style of the frame is changed in response to the scaling/combining control information before and after the changes, said image enhancing unit does not carry out the image enhancing processing.

2. The display unit according to claim 1, wherein said image enhancing unit carries out the image enhancing processing by correcting values of a display attribute in the correction target region.

3. The display unit according to claim 1, wherein said image enhancing unit comprises:
    a correction region managing unit obtaining the correction target region of the designated monomedia data in the composite video frame and a compression ratio in the correction target region in response to the scaling/combining control information;
    an encoding unit encoding the correction target region in the composite video frame at the compression ratio;
    a delaying frame buffer storing encoded data fed from said encoding unit to delay the encoded data by an interval of one frame;
    a previous frame decoding unit decoding the encoded data stored in said delaying frame buffer and delayed by an interval of one frame at the compression ratio;
    a current frame decoding unit decoding the encoded data fed from said encoding unit at the compression ratio;
    a correction data generating unit obtaining the interframe difference by comparing decoded data in the correction target region fed from said previous frame decoding unit and from said current frame decoding unit, and generating the correction data corresponding to the interframe difference obtained; and
    an image correction unit generating the video frame by carrying out the image enhancing processing by correcting the correction target region in the composite video frame in accordance with the correction data.

4. The display unit according to claim 1, further comprising:
    an image output unit displaying the video frame generated on a display.

5. A method for operating a display unit comprising:
    providing an image presentation unit receiving a plurality of monomedia data and presentation style data describing a presentation style of a frame of each of the individual monomedia data, generating scaling/combining control information for combining the individual monomedia data, and generating a composite video frame by combining the individual monomedia data; and
    providing an image enhancing unit obtaining a correction target region of designated monomedia data in the composite video frame in response to the scaling/combining control information, generating correction data by obtaining interframe difference in the correction target region, and generating a video frame by carrying out image enhancing processing of the correction target region in response to the correction data generated, wherein
    when the presentation style of the frame is changed,
        providing said image presentation unit generating the scaling/combining control information; and
        providing said image enhancement unit generating the video frame by carrying out the image enhancing processing of the correction target region in response to the scaling/combining control information changed, and
    when detecting that the presentation style of the frame is changed in response to the scaling/combining control information before and after the changes, providing said image enhancing unit does not carry out the image enhancing processing.

6. The method according to claim 5, wherein said providing an image enhancement unit carries out the image enhancing processing by correcting values of a display attribute in the correction target region.

7. The method according to claim 5, wherein said providing an image enhancement unit comprises:
    providing a correction region managing unit obtaining the correction target region of the designated monomedia data in the composite video frame and a compression ratio in the correction target region in response to the scaling/combining control information;
    providing an encoding unit encoding the correction target region in the composite video frame at the compression ratio;
    providing a delaying frame buffer storing encoded data fed from the correction target region to delay the encoded data by an interval of one frame;
    providing a previous frame decoding unit decoding the encoded data stored in said delaying frame buffer and delayed by an interval of one frame at the compression ratio;

providing a current frame decoding unit decoding the encoded data fed from said encoding unit at the compression ratio;

providing a correction data generating unit obtaining the interframe difference by comparing decoded data in the correction target region fed from said previous frame decoding unit and from said current frame decoding unit, and generating the correction data corresponding to the interframe difference obtained; and providing an image correction unit generating the video frame by carrying out the image enhancing processing by correcting the correction target region in the composite video frame in accordance with the correction data.

8. The method according to claim 5, further comprising:

providing an image output unit displaying the video frame generated on a display.

* * * * *